(12) United States Patent
Maruyama

(10) Patent No.: US 10,705,678 B2
(45) Date of Patent: Jul. 7, 2020

(54) IMAGE PROCESSING APPARATUS, IMAGE PROCESSING METHOD, AND STORAGE MEDIUM FOR GENERATING A VIRTUAL VIEWPOINT IMAGE

(71) Applicant: CANON KABUSHIKI KAISHA, Tokyo (JP)

(72) Inventor: Kazuna Maruyama, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/902,790

(22) Filed: Feb. 22, 2018

(65) Prior Publication Data

US 2018/0246631 A1 Aug. 30, 2018

(30) Foreign Application Priority Data

Feb. 28, 2017 (JP) ................................ 2017-035930

(51) Int. Cl.

| | |
|---|---|
| *G06F 3/0481* | (2013.01) |
| *G06T 19/20* | (2011.01) |
| *G06T 1/00* | (2006.01) |
| *H04N 13/111* | (2018.01) |
| *H04N 13/282* | (2018.01) |
| *H04N 5/272* | (2006.01) |
| *H04N 13/243* | (2018.01) |

(Continued)

(52) U.S. Cl.
CPC ........ *G06F 3/04815* (2013.01); *G06T 1/0007* (2013.01); *G06T 19/00* (2013.01); *G06T 19/20* (2013.01); *H04N 5/2723* (2013.01); *H04N 13/111* (2018.05); *H04N 13/243* (2018.05); *H04N 13/282* (2018.05); *G06T 17/00* (2013.01)

(58) Field of Classification Search
None
See application file for complete search history.

(56) References Cited

U.S. PATENT DOCUMENTS

| | | |
|---|---|---|
| 2005/0001852 A1 | 1/2005 | Dengler |
| 2005/0018045 A1* | 1/2005 | Thomas ................ G06K 9/209 348/157 |

(Continued)

FOREIGN PATENT DOCUMENTS

| | | |
|---|---|---|
| JP | 201248639 A | 3/2012 |
| WO | 2017005955 A1 | 1/2017 |
| WO | 2017023456 A1 | 2/2017 |

*Primary Examiner* — Jeffrey J Chow
(74) *Attorney, Agent, or Firm* — Canon U.S.A., Inc. IP Division

(57) ABSTRACT

An image processing apparatus includes an acquisition unit configured to acquire viewpoint information for identifying a movement path of a virtual viewpoint relating to generation of a virtual viewpoint image, the virtual viewpoint image being generated based on captured images obtained by a plurality of cameras that performs imaging from a plurality of directions, and a control unit configured to determine a display area of a virtual object to be inserted into the virtual viewpoint image, wherein the control unit determines the display area of the virtual object in the virtual viewpoint image corresponding to a virtual viewpoint at a first point in time on the movement path identified from the acquired viewpoint information, based on the virtual viewpoint at the first point in time, and a virtual viewpoint at a second point in time on the movement path.

20 Claims, 13 Drawing Sheets

(51) Int. Cl.
*G06T 19/00* (2011.01)
*G06T 17/00* (2006.01)

(56) References Cited

U.S. PATENT DOCUMENTS

| | | |
|---|---|---|
| 2008/0231751 A1 | 9/2008 | Zalewski |
| 2009/0290848 A1* | 11/2009 | Brown .................. H04N 5/232 |
| | | 386/223 |
| 2010/0020068 A1* | 1/2010 | House .................... G06T 15/20 |
| | | 345/419 |
| 2011/0188836 A1 | 8/2011 | Popkiewicz |
| 2011/0229054 A1 | 9/2011 | Weston |
| 2012/0050256 A1* | 3/2012 | Thiel .................... G06T 19/003 |
| | | 345/419 |
| 2012/0180084 A1 | 7/2012 | Huang |
| 2013/0321575 A1* | 12/2013 | Kirk ...................... G06T 15/04 |
| | | 348/43 |
| 2014/0165093 A1 | 6/2014 | Redol |
| 2014/0240318 A1* | 8/2014 | Coombe ............... G06T 19/003 |
| | | 345/427 |
| 2014/0278847 A1* | 9/2014 | Gallo .................... G06Q 30/0252 |
| | | 705/14.5 |
| 2016/0132941 A1* | 5/2016 | Han ..................... H04N 21/234 |
| | | 705/14.69 |
| 2016/0212455 A1 | 7/2016 | Manna |
| 2016/0250549 A1 | 9/2016 | Zalewski |
| 2016/0320951 A1* | 11/2016 | Ernst .................. G06F 3/04842 |

* cited by examiner

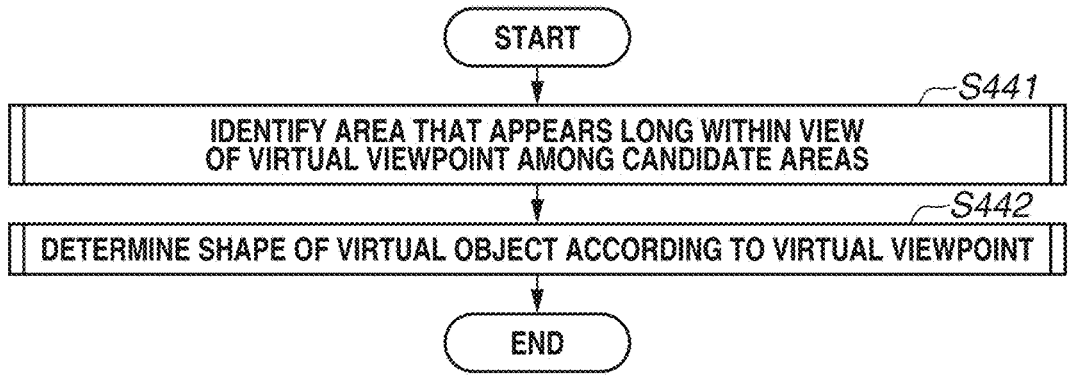
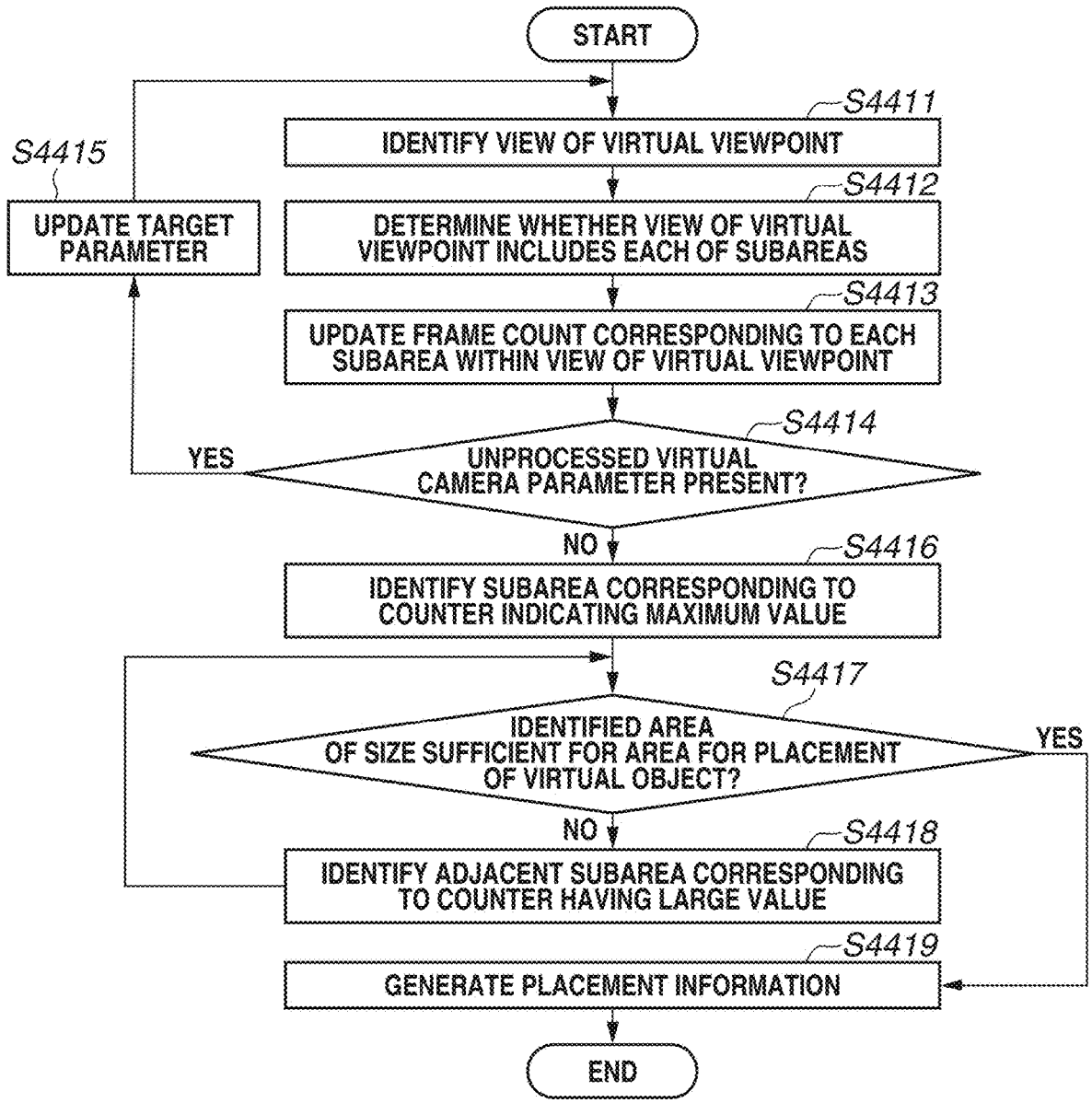

IMAGE PROCESSING APPARATUS, IMAGE PROCESSING METHOD, AND STORAGE MEDIUM FOR GENERATING A VIRTUAL VIEWPOINT IMAGE

BACKGROUND OF THE INVENTION

Field of the Invention

The present invention relates to a technique for generating a virtual viewpoint image.

Description of the Related Art

Conventionally, there has been proposed a technique of imaging a subject from a plurality of directions by a plurality of cameras installed at different positions, and generating a virtual viewpoint image by using a plurality of captured images (a plurality of viewpoint images) obtained by this imaging. According to the technique of generating the virtual viewpoint image from the plurality of viewpoint images, for example, a highlight scene of soccer or basketball can be viewed from various angles, and a viewer can have more realistic feeling than that from a normal captured image.

Japanese Patent Application Laid-Open No. 2012-48639 discusses displaying an advertisement as a virtual object that is not included in a plurality of viewpoint images, by inserting the advertisement into a virtual viewpoint image, as if affixing the advertisement to a real object included in the plurality of viewpoint images.

However, in the conventional technique, it is conceivable that, in a case where a virtual viewpoint relating to generation of a virtual viewpoint image moves, a virtual object may not be displayed in an appropriate area of the virtual viewpoint image. For example, there is a possibility that the virtual object to be included in the virtual viewpoint image may not be included in the virtual viewpoint image, due to the movement of the virtual viewpoint. Further, for example, there is a possibility that an important subject included in the virtual viewpoint image may be covered by the virtual object, due to the movement of the virtual viewpoint.

SUMMARY OF THE INVENTION

According to an aspect of the present invention, an image processing apparatus includes an acquisition unit configured to acquire viewpoint information for identifying a movement path of a virtual viewpoint relating to generation of a virtual viewpoint image, the virtual viewpoint image being generated based on captured images obtained by a plurality of cameras that performs imaging from a plurality of directions, and a control unit configured to determine a display area of a virtual object to be inserted into the virtual viewpoint image, wherein the control unit determines the display area of the virtual object in the virtual viewpoint image corresponding to a virtual viewpoint at a first point in time on the movement path identified from the acquired viewpoint information, based on the virtual viewpoint at the first point in time, and a virtual viewpoint at a second point in time on the movement path, the second point in time being different from the first point in time.

Further features of the present invention will become apparent from the following description of exemplary embodiments with reference to the attached drawings.

BRIEF DESCRIPTION OF THE DRAWINGS

FIGS. 6A, 6B, and 6C are flowcharts illustrating processing relating to determination of a position of a virtual object by the image processing apparatus.

DESCRIPTION OF THE EMBODIMENTS

<System Configuration>

Figure 1:
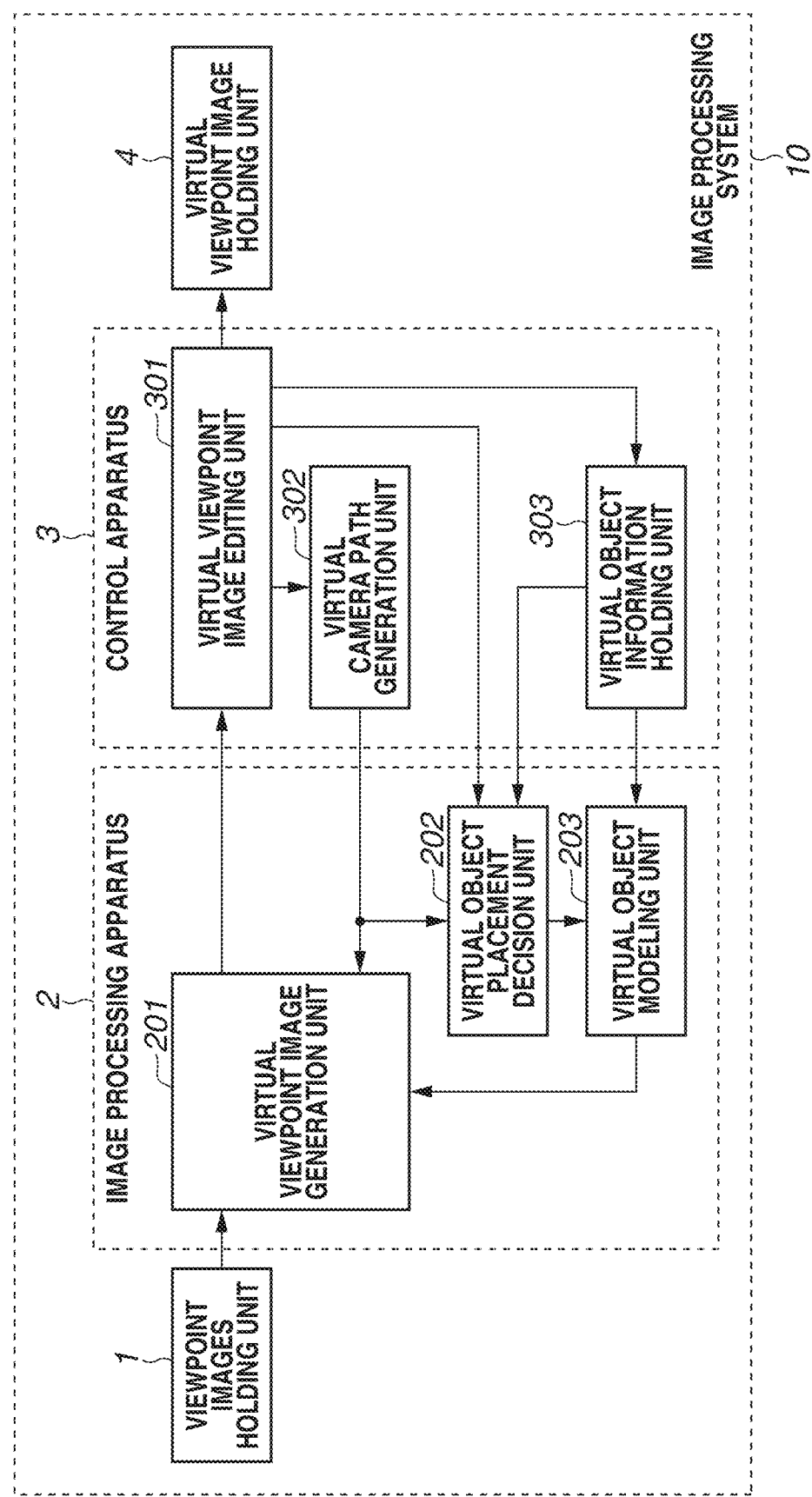
FIG. 1 is a block diagram illustrating a configuration of an image processing system.

FIG. 1 is a diagram illustrating an example of an overall configuration of an image processing system 10 according to an exemplary embodiment. The image processing system 10 includes a viewpoint images holding unit 1 (hereinafter referred to as holding unit 1), an image processing apparatus 2, a control apparatus 3, and a virtual viewpoint image holding unit 4 (hereinafter referred to as holding unit 4).

A virtual viewpoint image according to the present exemplary embodiment is an image obtained in a case where a subject is imaged from a virtual viewpoint. In other words, the virtual viewpoint image is an image representing a sight from a specified viewpoint. The virtual viewpoint may be specified by a user, or may be automatically specified based on information such as a result of image analysis. In other words, the virtual viewpoint image includes an arbitrary viewpoint image (free-viewpoint image) corresponding to a viewpoint freely specified by the user. The virtual viewpoint image also includes an image corresponding to a viewpoint specified by the user from among a plurality of candidates, and an image corresponding to a viewpoint automatically specified by an apparatus. In the present exemplary embodiment, the virtual viewpoint image corresponds to each frame of a moving image generated in the image processing system 10. In other words, the image processing system 10 generates a moving image formed of a plurality of virtual viewpoint images that is temporally consecutive. The user in the present exemplary embodiment is an operator who controls generation of the virtual viewpoint image by operating the control apparatus 3, and is distinguished from a viewer who views the virtual viewpoint image delivered from the image processing system 10. However, the operator and the viewer may be the same user.

The holding unit 1 holds a plurality of captured images (a plurality of viewpoint images) obtained by imaging a subject by each of a plurality of cameras from different directions. The holding unit 1 transmits the captured images to the image processing apparatus 2. The plurality of cameras is installed to surround, for example, a sports stadium field or a live stage, and synchronously performs imaging. However, the plurality of cameras may not be installed all around the subject, if the plurality of cameras is installed to image a subject such as a field or a stage from a plurality of directions. In the present exemplary embodiment, each of the plurality of cameras transmits the captured image to the holding unit 1, and the holding unit 1 transmits those captured images to the image processing apparatus 2. However, this is not limitative, and the captured images may be directly transmitted from the plurality of cameras to the image processing apparatus 2. Further, the image held by the holding unit 1 or the image to be transmitted to the image processing apparatus 2 may be, for example, an image generated based on a difference between a plurality of captured images, instead of the captured image itself.

The image processing apparatus 2 includes a virtual viewpoint image generation unit 201 (hereinafter referred to as image generation unit 201), a virtual object placement determination unit 202 (hereinafter referred to as placement determination unit 202), and a virtual object modeling unit 203 (hereinafter referred to as modeling unit 203).

The image generation unit 201 generates a three-dimensional model expressing the shape of the subject, from the plurality of viewpoint images acquired from the holding unit 1. According to a virtual camera path acquired from a virtual camera path generation unit 302 (hereinafter referred to as path generation unit 302) of the control apparatus 3, the image generation unit 201 maps a texture expressing color and feel into the three-dimensional model of the subject, thereby generating a virtual viewpoint image. A method for generating the virtual viewpoint image by the image processing apparatus 2 is not limited to this example. For example, the image processing apparatus 2 may generate a virtual viewpoint image, by performing transformation or composition of a captured image, without generating a three-dimensional model.

The virtual camera path is viewpoint information for identifying a movement path of a virtual viewpoint relating to generation of the virtual viewpoint image. The control apparatus 3 generates the virtual camera path, according to specification of the virtual viewpoint by the user. The virtual camera path of the present exemplary embodiment includes information for identifying a viewpoint position and information for identifying a viewing direction. However, this is not limitative, and the virtual camera path may not include information about the viewing direction. In this case, for example, the viewing direction relating to the virtual viewpoint may be determined, based on the viewpoint position identified by the virtual camera path, and the position of a predetermined fixation point. Further, the virtual camera path may include other parameters such as a viewing angle.

The image generation unit 201 generates the virtual viewpoint image including the virtual object, by combining a model of the virtual object acquired from the modeling unit 203 with the three-dimensional model of the subject, and mapping the texture of the virtual object into the model. The image generation unit 201 outputs the generated virtual viewpoint image to a virtual viewpoint image editing unit 301 (hereinafter referred to as editing unit 301) of the control apparatus 3. The virtual object is not included in the plurality of viewpoint images, but included in the virtual viewpoint image. In the present exemplary embodiment, the virtual object is described as a planar object for displaying an advertisement in the virtual viewpoint image. However, the shape and the use purpose of the virtual object are not limited to this case. For example, the virtual object may display information about the progress of a game, or may display characters and an image for describing a subject such as a person. Further, the virtual object may be, for example, an object of a three-dimensional shape such as a rectangular solid or a sphere.

The placement determination unit 202 generates placement information of the virtual object, from the virtual camera path acquired from the path generation unit 302, and placement candidate information acquired from a virtual object information holding unit 303 (hereinafter referred to as information holding unit 303) of the control apparatus 3. The placement determination unit 202 then outputs the generated placement information to the modeling unit 203. In the present exemplary embodiment, the placement candidate information is information indicating an area to be a candidate for placement of the virtual object in a three-dimensional space (e.g., stadium) where the subject is present. The placement information of the virtual object is information about at least one of a position, a size, a shape, and an orientation of the virtual object. The placement information may identify all of the position, the size, the shape, and the orientation of the virtual object. Alternatively, at least one of the position, the size, the shape, and the orientation of the virtual object may be set as a preset value independent of the placement information. A method for determining placement of the virtual object by the placement determination unit 202 will be described in detail below.

Figure 3:
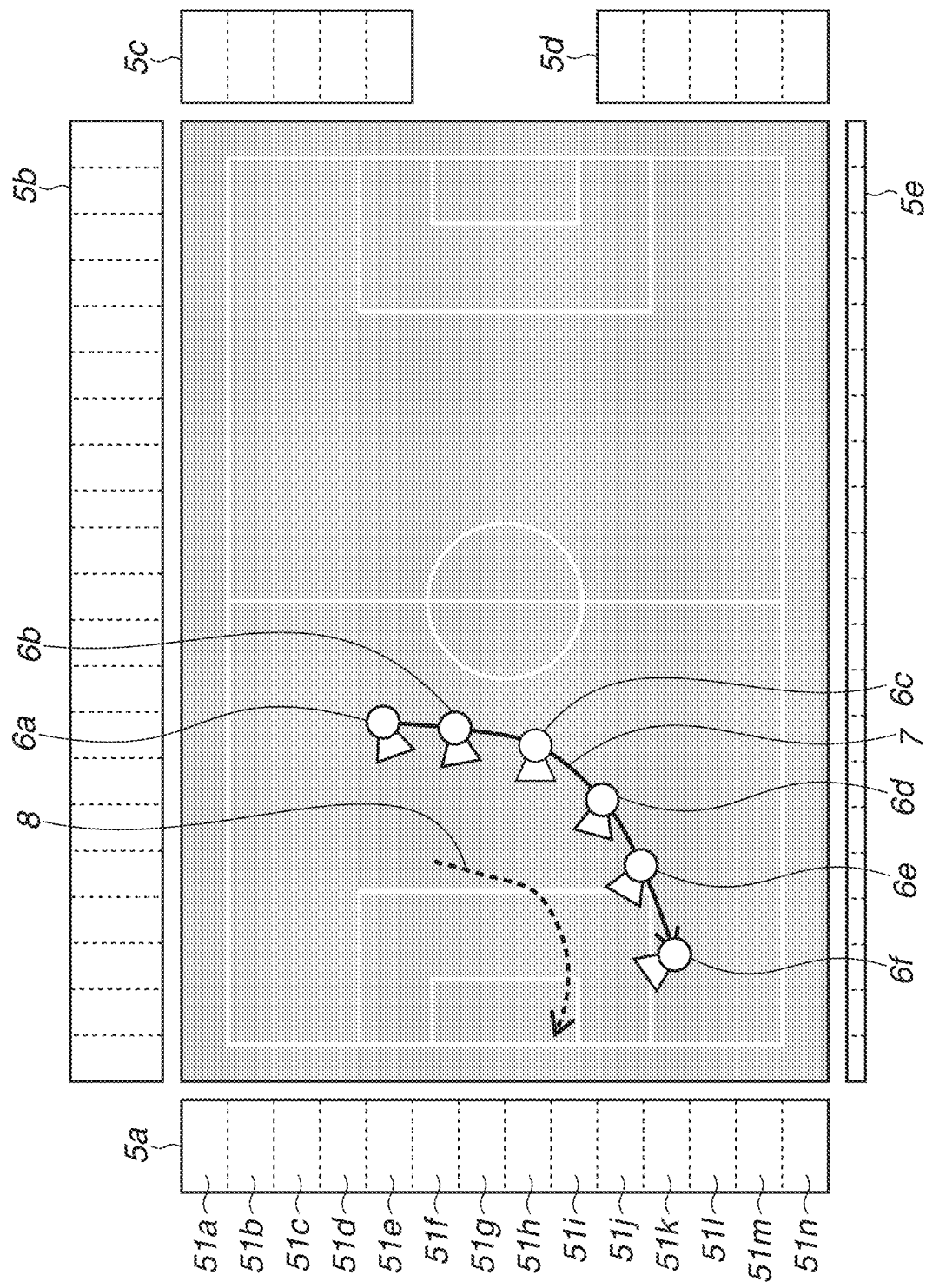
FIG. 3 is a diagram illustrating placement of a virtual object and a movement path of a virtual viewpoint.

The placement candidate of the virtual object will be described with reference to FIG. 3. In an example illustrated in FIG. 3, a placement candidate area 5 of the virtual object is present around a field for soccer. The placement candidate area 5 is formed of a plurality of areas, i.e., areas 5a to 5e. The area 5a is divided into a plurality of areas, i.e., subareas 51a to 51n. The placement candidate area 5 may be provided over an entire side surface of the field, as represented by the area 5a and the area 5b, or may be provided to avoid being close to a predetermined subject such as a soccer goal, as represented by the area 5c and the area 5d. The areas 5a to 5d are each a three-dimensional area. The area 5e is a two-dimensional area perpendicular to the field plane. Without being limited to the areas illustrated in FIG. 3, the placement candidate area 5 may be, for example, inside of the field or in the air.

The modeling unit 203 generates a three-dimensional model of the virtual object, from the placement information of the virtual object acquired from the placement determination unit 202, and virtual object information acquired from the information holding unit 303. The virtual object information includes information about the shape and the texture of the virtual object. The virtual object information may include an identifier for identifying the advertisement to be displayed by this virtual object. The modeling unit 203 then outputs the generated model of the virtual object, and the texture to be mapped into this model, to the image generation unit 201.

The control apparatus 3 includes the editing unit 301, the path generation unit 302, and the information holding unit 303. The editing unit 301 receives an operation performed by the user, and provides an instruction to the image processing apparatus 2 according to the received operation. For example, the editing unit 301 includes an operation unit such as a joystick, a jog dial, a touch panel, a keyboard, and a mouse, and receives an operation of the user via the operation unit. Further, the editing unit 301 includes a display unit to display, for example, a graphical user interface (GUI) and a virtual viewpoint image generated by the image processing apparatus 2 to the user.

Specifically, the editing unit 301 instructs the image processing apparatus 2 that generates a virtual viewpoint image, on a scene (at the time of imaging) of a plurality of viewpoint images for generating a virtual viewpoint image. The editing unit 301 also instructs the image processing apparatus 2 to adjust a playback speed of a generated moving image or to pause. Further, the editing unit 301 instructs the path generation unit 302 to generate a virtual camera path based on specification of a virtual viewpoint by the user, and instructs the placement determination unit 202 to insert a virtual object into the virtual viewpoint image. Further, the editing unit 301 acquires the virtual viewpoint image generated by the image generation unit 201 based on the instruction, and previews the acquired virtual viewpoint image to the user. Moreover, the editing unit 301 abandons the previewed virtual viewpoint image or outputs the previewed virtual viewpoint image to the holding unit 4, according to an instruction of the user.

In response to reception of the instruction for generating the virtual camera path from the editing unit 301, the path generation unit 302 determines a viewpoint position and a viewing direction on a movement path of the virtual viewpoint, based on the instruction. The path generation unit 302 then generates the virtual camera path, which is formed of a plurality of virtual camera parameters that is temporally consecutive. Each of the virtual camera parameters is a parameter indicating the position and the direction of the virtual viewpoint. Each of the virtual camera parameters is associated with information for identifying to which scene the parameter corresponds, such as a frame number and a time code. In addition, the path generation unit 302 provides the generated virtual camera path to the placement determination unit 202. The form of the information of the virtual camera path is not limited to this example.

Now, an example of the movement path of the virtual viewpoint will be described with reference to FIG. 3. In the example illustrated in FIG. 3, a movement path 7 of a virtual viewpoint is set to follow an object of interest from rear. In this example, the object of interest is a ball moving along a trajectory 8 toward a goal. The virtual camera path generated by the path generation unit 302 is, for example, information for identifying the movement path 7. The virtual camera path includes the virtual camera parameter corresponding to each of virtual viewpoints 6a to 6f on the movement path 7. Thus, in this example, the virtual camera path for identifying the virtual viewpoint for six frames is generated. When specifying the movement path 7 via the editing unit 301, the user may specify a line indicating the movement path 7, or may specify some virtual viewpoints (e.g., virtual viewpoints 6a, 6d, and 6f) on a movement path, as points. In a case where the points are specified, for example, the path generation unit 302 may calculate remaining virtual viewpoints (i.e., virtual viewpoints 6b, 6c, and 6e), by a method such as spline interpolation. The spline interpolation is a method for generating a curve passing through or near the specified points.

The information holding unit 303 holds the placement candidate information and the virtual object information of the virtual object. The information holding unit 303 outputs the held placement candidate information to the placement determination unit 202, in response to a request from the placement determination unit 202. Further, the information holding unit 303 outputs the held virtual object information to the modeling unit 203, in response to a request from the modeling unit 203.

The holding unit 4 acquires and holds the virtual viewpoint image generated by the image processing apparatus 2 via the editing unit 301. The virtual viewpoint image held by the holding unit 4 is then output to an apparatus such as a playback apparatus possessed by the viewer. The virtual viewpoint image held by the holding unit 4 may be delivered to the viewer, after being subjected to editing processing. Further, the virtual viewpoint image generated by the image processing system 10 may be delivered in real time.

In the present exemplary embodiment, the image processing apparatus 2 includes both of the placement determination unit 202 that determines the placement of the virtual object, and the image generation unit 201 that generates the virtual viewpoint image according to the determination made by the placement determination unit 202. However, this is not limitative. For example, an image generation apparatus different from the image processing apparatus 2 may include the image generation unit 201. In this case, the placement determination unit 202 may control the area for displaying the virtual object in the virtual viewpoint image, by outputting information about at least one of the position, the size, the shape, and the orientation of the virtual object to the image generation apparatus. Alternatively, the control apparatus 3 may include the placement determination unit 202 and the modeling unit 203.

<Hardware Configuration>

Figure 2:
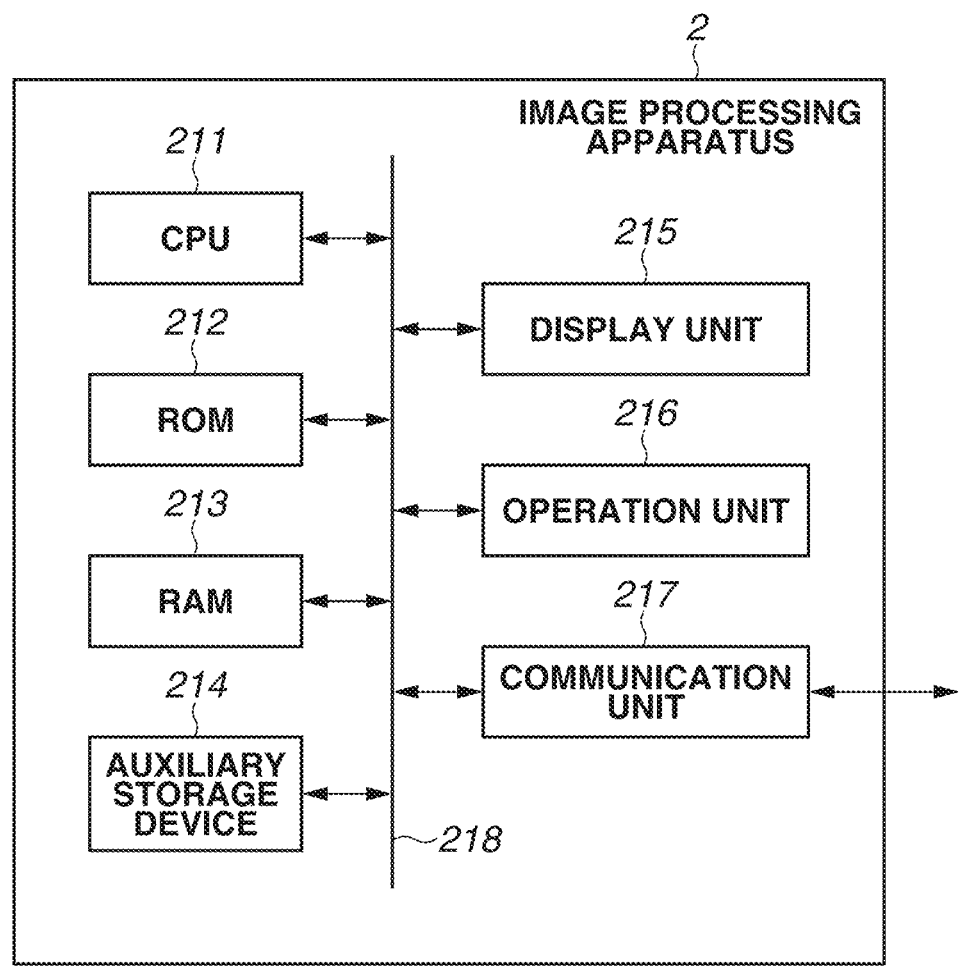
FIG. 2 is a block diagram illustrating a hardware configuration of an image processing apparatus.

Next, a hardware configuration of the image processing apparatus 2 will be described with reference to FIG. 2. A hardware configuration of the control apparatus is similar to the hardware configuration of the image processing apparatus 2. The image processing apparatus 2 has a central processing unit (CPU) 211, a read only memory (ROM) 212, a random access memory (RAM) 213, an auxiliary storage device 214, a display unit 215, an operation unit 216, a communication unit 217, and a bus 218. The CPU 211 controls the entire image processing apparatus 2, by using a computer program and data stored in the ROM 212 or the RAM 213. The image processing apparatus 2 may have a graphics processing unit (GPU), and the GPU may perform at least a part of processing performed by the CPU 211. The ROM 212 stores a program and a parameter not requiring modification. The RAM 213 temporarily stores a program and data supplied from the auxiliary storage device 214, and data supplied from outside via the communication unit 217. The auxiliary storage device 214 is configured of, for example, a hard disk drive, and stores content data such as still images and moving images.

The display unit 215 is configured of, for example, a liquid crystal display, and displays a GUI for the user to operate the image processing apparatus 2. The operation unit 216 is configured of, for example, a keyboard and a mouse. The operation unit 216 inputs various instructions into the CPU 211, by receiving an operation performed by the user. The communication unit 217 communicates with an external device such as the holding unit 1 and the control apparatus 3. For example, in a case where the image processing apparatus 2 is connected to an external device by wire, a local area network (LAN) cable is connected to the communication unit 217. In a case where the image processing apparatus 2 has a function of wirelessly communicating with an external device, the communication unit 217 includes an antenna. The bus 218 connects all units of the image processing apparatus 2, and transmits information.

In the present exemplary embodiment, the image processing apparatus 2 includes the display unit 215 and the operation unit 216, but may not include at least one of the display unit 215 and the operation unit 216. Further, at least one of the display unit 215 and the operation unit 216 may be present outside the image processing apparatus 2 as a separate device, and the CPU 211 may operate as a display controller for controlling the display unit 215, and an operation controller for controlling the operation unit 216.

<Operation Flow>

Figure 4:
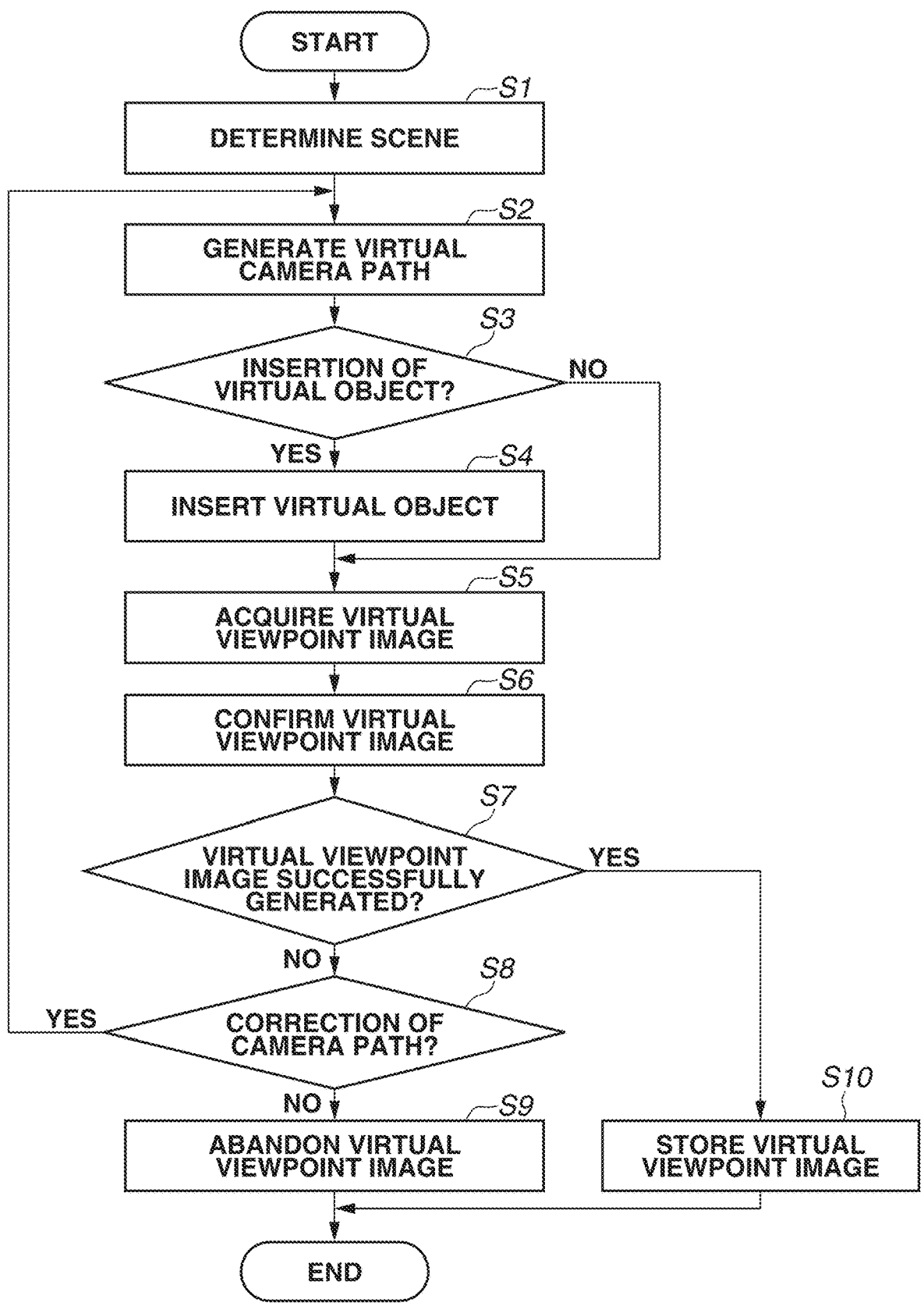
FIG. 4 is a flowchart illustrating processing relating to generation of a virtual viewpoint image by a control apparatus.

Next, processing relating to generation of a virtual viewpoint image by the control apparatus 3 will be described with reference to FIG. 4. The processing illustrated in FIG. 4 starts when the editing unit 301 receives an operation performed by the user to start generation of a virtual viewpoint image. For example, the user performs the operation when generating the virtual viewpoint image as a replay image from a captured image obtained during a game. The user performs the operation via the operation unit 216, while viewing the display unit 215 of the control apparatus 3. However, the timing when the processing illustrated in FIG. 4 starts is not limited to the above-described timing. The CPU 211 of the control apparatus 3 loads a program stored in the ROM 212 into the RAM 213, and executes the loaded program, thereby implementing the processing illustrated in FIG. 4. A dedicated piece of hardware different from the CPU 211 may implement at least a part of the processing illustrated in FIG. 4.

In step S1, according to a scene determination operation performed by the user, the editing unit 301 determines a start frame and an end frame of a moving image of a virtual viewpoint image to be generated. In step S2, the editing unit 301 generates a virtual camera path and outputs the generated virtual camera path to the image processing apparatus 2, by controlling the path generation unit 302 based on the specification of a virtual viewpoint by the user. The editing unit 301 may receive specification of a playback speed for the moving image from the user, and may include information about the playback speed in the virtual camera path.

In step S3, the editing unit 301 determines whether to insert a virtual object into the virtual viewpoint image, based on the operation performed by the user. For example, in a case of inserting an advertisement as the virtual object into the virtual viewpoint image, the user clicks a button for generating the virtual viewpoint image, after checking an advertisement insertion item on a GUI displayed by the control apparatus 3. On the other hand, in a case of not inserting an advertisement into the virtual viewpoint image, the user clicks a button for generating the virtual viewpoint image, without checking the advertisement insertion item.

If the editing unit 301 determines that the virtual object is to be inserted (YES in step S3), the processing proceeds to step S4. In step S4, the editing unit 301 instructs the image processing apparatus 2 to insert the virtual object, and outputs virtual object information and placement candidate information to the image processing apparatus 2, by controlling the information holding unit 303. Next, in step S5, the editing unit 301 acquires the virtual viewpoint image including the virtual object generated by the image processing apparatus 2. Processing for inserting the virtual object by the image processing apparatus 2 will be described below with reference to FIG. 5. On the other hand, if the editing unit 301 determines that the virtual object is not to be inserted (NO in step S3), the processing proceeds to step S5. In step S5, the editing unit 301 acquires the virtual viewpoint image not including the virtual object generated by the image processing apparatus 2.

In step S6, the editing unit 301 previews the virtual viewpoint image acquired from the image processing apparatus 2 to allow confirmation by the user. The user can confirm the preview, and make an adjustment such as correction of the virtual camera path as necessary. In step S7, the editing unit 301 determines whether generation of the virtual viewpoint image desired by the user is successful, based on the operation performed by the user. If the editing unit 301 determines that the generation is successful (YES in step S7), the processing proceeds to step S10. In step S10, the editing unit 301 outputs the moving image of the generated virtual viewpoint image to the holding unit 4, and the holding unit 4 stores the received image. Then, the processing is terminated.

On the other hand, if the editing unit 301 determines that the generation is unsuccessful (NO in step S7), the processing proceeds to step S8. In step S8, the editing unit 301 determines whether to correct the virtual camera path, based on the user operation. If the editing unit 301 determines that the virtual camera path is to be corrected (YES in step S8), the processing returns to step S2. In step S2, the editing unit 301 generates a new virtual camera path, and instructs the generation of the virtual viewpoint image again. If the editing unit 301 determines that the virtual camera path is not to be corrected (NO in step S8), the processing proceeds to step S9. In step S9, the editing unit 301 abandons the virtual viewpoint image. Then, the processing is terminated.

Figure 5:
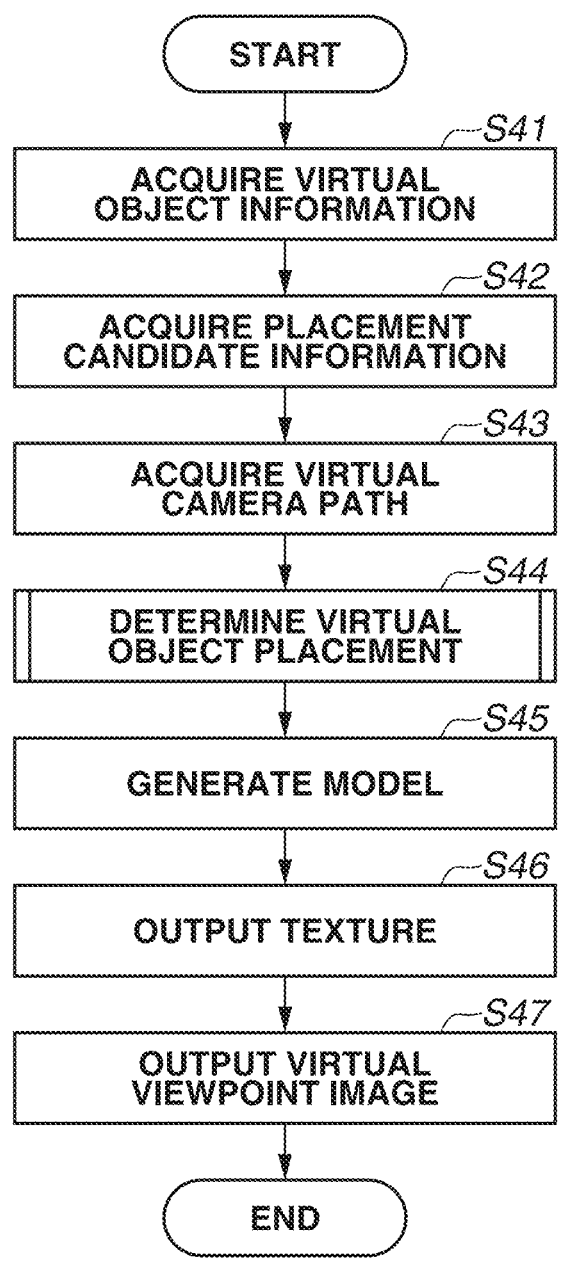
FIG. 5 is a flowchart illustrating processing relating to insertion of a virtual object by the image processing apparatus.

Next, the processing for inserting the virtual object by the image processing apparatus 2 will be described with reference to FIG. 5. The processing illustrated in FIG. 5 starts when the placement determination unit 202 receives an instruction for inserting the virtual object, from the control apparatus 3. However, the timing when the processing illustrated in FIG. 5 starts is not limited to the above-described timing. The CPU 211 of the image processing apparatus 2 loads a program stored in the ROM 212 into the RAM 213, and executes the loaded program, thereby implementing the processing illustrated in FIG. 5. A dedicated piece of hardware different from the CPU 211 may implement at least a part of the processing illustrated in FIG. 5.

In step S41, the modeling unit 203 acquires the virtual object information from the information holding unit 303. In step S42, the placement determination unit 202 acquires the placement candidate information of the virtual object from the information holding unit 303. In a case where the generation of the virtual viewpoint image is performed again based on the determination in step S8 of FIG. 4, the process performed in each of step S41 and step S42 may be omitted. In step S43, the image generation unit 201 and the placement determination unit 202 acquire the virtual camera path from the path generation unit 302. The execution order of the processes performed in steps S41, S42, and S43 may be different from the example illustrated in FIG. 5, or these processes may be performed in parallel.

In step S44, the placement determination unit 202 determines placement of the virtual object based on the acquired placement candidate information and virtual camera path, and generates placement information according to the result of this determination. A method for determining the placement of the virtual object will be described in detail below with reference to flowcharts in FIGS. 6A to 6C. The placement information generated by the placement determination unit 202 is output to the modeling unit 203. In step S45, based on the acquired virtual object information and placement information, the modeling unit 203 generates a three-dimensional model of the virtual object to be inserted into the virtual viewpoint image, and outputs the generated three-dimensional model to the image generation unit 201. In step S46, the modeling unit 203 outputs a texture based on the acquired virtual object information, to the image generation unit 201. The processing order of step S46 and step S45 may be reversed, or may be performed in parallel. In step S47, the image generation unit 201 generates the virtual viewpoint image by using the model and the texture of the virtual object, and outputs the generated virtual viewpoint image to the control apparatus 3. Then, the processing is terminated.

As described above, the model of the virtual object is generated based on the placement information generated by the placement determination unit 202, and the virtual object is combined with the virtual viewpoint image in the image generation unit 201. In other words, the placement determination unit 202 can control the display area for displaying the virtual object in the virtual viewpoint image, according to the movement path of the virtual viewpoint, by generating the placement information about the position of the virtual object based on the acquired virtual camera path, and outputting the generated placement information.

<Details of Processing>

Figure 6C:
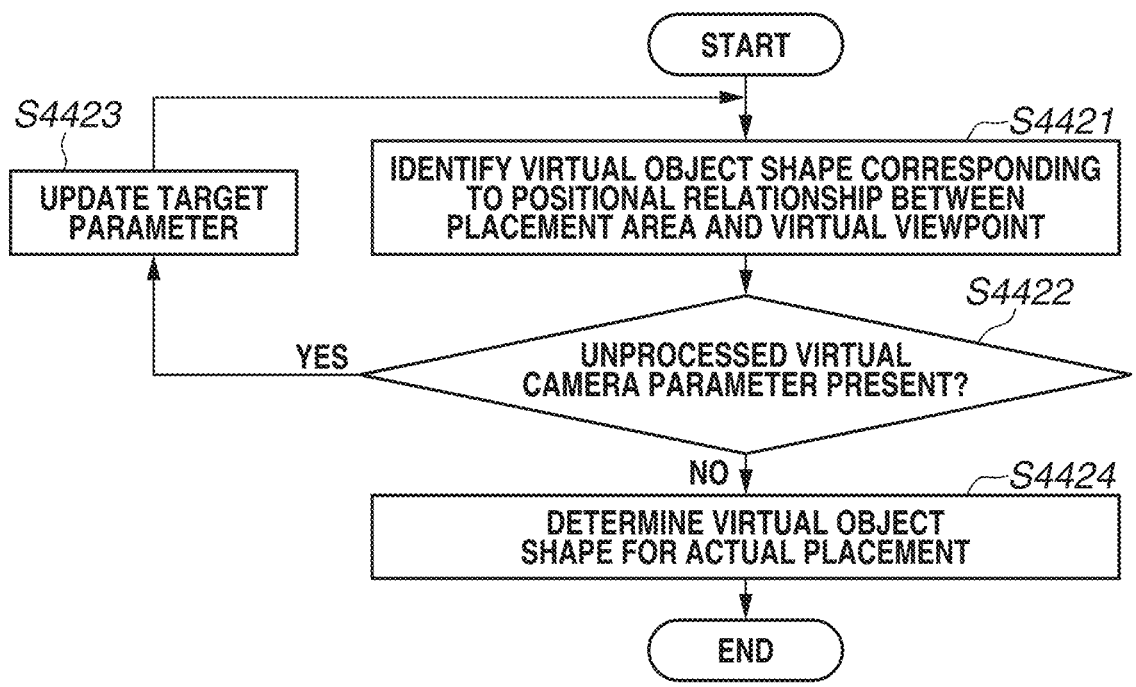

Processing relating to the determination of the position of the virtual object by the image processing apparatus 2 will be described with reference to FIGS. 6A to 6C. FIG. 6A illustrates details of the processing in step S44 of FIG. 5. In step S441, the placement determination unit 202 identifies, as an area for placing the virtual object, an area that appears for a long time within the view of the virtual viewpoint moving according to the virtual camera path (area displayed for a long period in the moving image of the virtual viewpoint image), among a plurality of candidate areas indicated by the placement candidate information.

In other words, the placement determination unit 202 determines the placement, in such a manner that the virtual object is included in a predetermined number of virtual viewpoint images, among a plurality of virtual viewpoint images respectively corresponding to a plurality of virtual viewpoints, on the movement path identified from the virtual camera path. This predetermined number may be a value determined based on the number of virtual camera parameters included in the virtual camera path, or may be a value specified by the user. Further, the predetermined value may be a value determined based on how many virtual viewpoint images among the above-described plurality of virtual viewpoint images include each of the candidate areas. In the present exemplary embodiment, a candidate area included in the largest number of virtual viewpoint images is described to be identified as the area for placement of the virtual object. Assume that there is such a candidate area that the virtual object is to be displayed in all of the above-described plurality of virtual viewpoint images. In this case, this candidate area is identified as the area for placement of the virtual object. In the present exemplary embodiment, the position of the virtual object determined in this way is a fixed position in a three-dimensional space, and does not move with the movement of the virtual viewpoint.

In step S442, based on the movement path of the virtual viewpoint, the placement determination unit 202 determines an orientation and a shape of the virtual object to be placed in the identified area. The orientation and the shape of the virtual object may be set beforehand independently of the virtual viewpoint. In a case where the candidate area is a two-dimensional area as represented by the area 5e in FIG. 3, the orientation of the virtual object is uniquely determined.

Next, processing for identifying the area for placement of the virtual object will be described with reference to FIG. 6B and FIGS. 7A to 7G. FIG. 6B illustrates details of the processing performed in step S441 of FIG. 6A. In step S4411, the placement determination unit 202 identifies the view of the virtual viewpoint 6a in the start frame of the moving image, by analyzing the leading virtual camera parameter of the virtual camera path. In step S4412, the placement determination unit 202 determines whether the view of the virtual viewpoint 6a includes each of the subareas 51 included in the placement candidate area 5 of the virtual object.

In step S4413, for each of the subareas 51, the placement determination unit 202 updates the value of a counter indicating a frame count corresponding to the subarea within the view of the virtual viewpoint 6. In a case where the virtual viewpoint 6a in the start frame has a view 61a illustrated in FIG. 7A, the subareas 51 included in a part surrounded by a thick frame of the area 5a are within the view of the virtual viewpoint 6a. Therefore, the value of the counter of each of these subareas 51 is updated from 0 to 1. In step S4414, the placement determination unit 202 determines whether an unprocessed virtual camera parameter is present. If the placement determination unit 202 determines that an unprocessed virtual camera parameter is present (YES in step S4414), the processing proceeds to step S4415. In step S4415, the placement determination unit 202 sets the next virtual camera parameter to be an analyzing target. Then, the processing returns to step S4411.

Figure 7A:
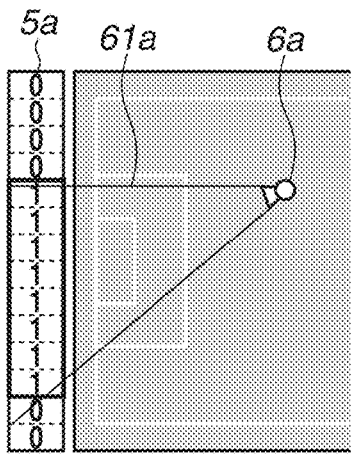
FIGS. 7A, 7B, 7C, 7D, 7E, 7F, and 7G are diagrams illustrating a method for determining a position of a virtual object.
Figure 7B:
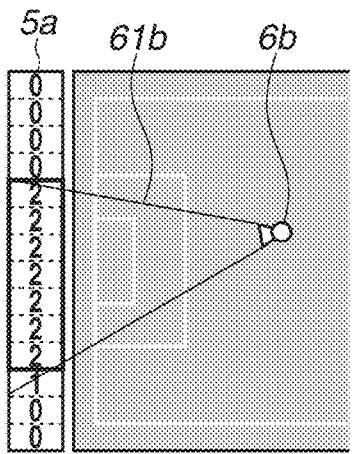
Figure 7C:
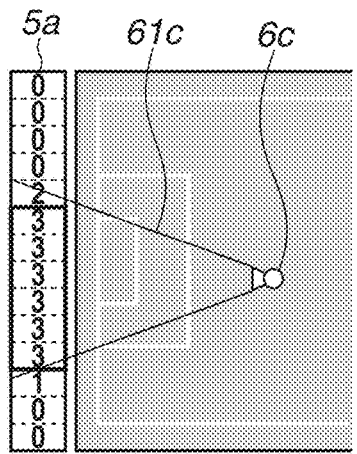
Figure 7D:
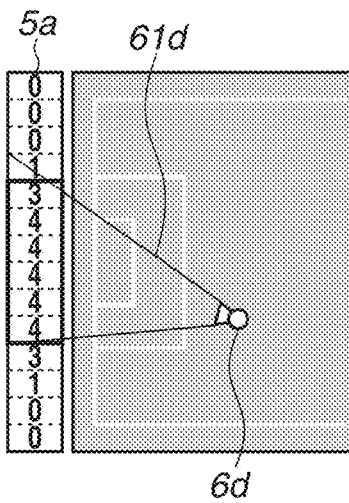
Figure 7E:
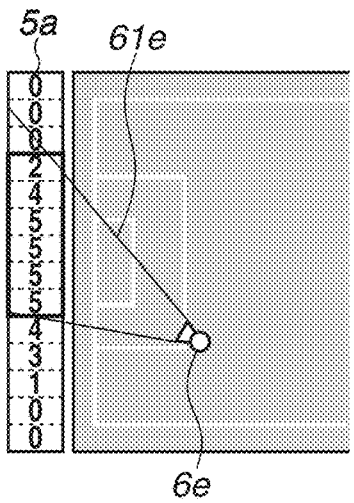

In a case where the virtual viewpoint 6 moves to the virtual viewpoint 6b as illustrated in FIG. 7B, the subareas 51 included in a part surrounded by a thick frame are within a view 61b of the virtual viewpoint 6b. Therefore, the value of the counter is updated for each of these subareas 51. In the example illustrated in FIG. 7B, the value of the counter of the subarea 51 that has changed from inside to outside of the view remains at 1, and the value of the counter of the subarea 51 staying within the view is updated from 1 to 2. Assume that, similarly, the virtual viewpoint 6 moves as illustrated in FIGS. 7C, 7D, 7E, and 7F, and the virtual viewpoint 6f is the virtual viewpoint in the end frame of the moving image. In this case, the counters at the time when all the virtual camera parameters are analyzed indicate values illustrated in FIG. 7F. If the placement determination unit 202 determines that no unprocessed virtual camera parameter is present (NO in step S4414), the processing proceeds to step S4416.

In step S4416, the placement determination unit 202 identifies the subarea 51 corresponding to the counter indicating the maximum value. In the example illustrated in FIG. 7F, the subareas 51f, 51g, and 51h, each corresponding to the counter indicating the maximum value of 6, are identified. In step S4417, based on the number of adjacent subareas 51 among the identified subareas 51, the placement determination unit 202 determines whether an area with a size sufficient for the area for placing the virtual object is identified. Specifically, this determination is performed by determining whether the number of the identified adjacent subareas 51 is equal to or more than a threshold corresponding to a predetermined size of the virtual object. Such determination is not limited to this example. For example, the ratio of the number of the identified adjacent subareas 51 to the total number of the subareas 51 may be compared with a threshold.

Figure 7F:
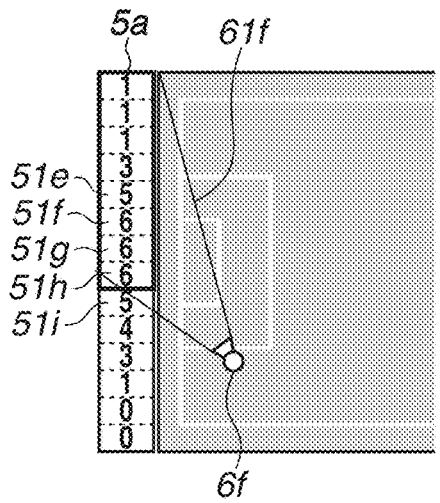

In a case where the threshold to be compared with the number of the identified subareas 51 is 5, the number of the identified subareas 51 is 3, in the example illustrated in FIG. 7F. In this case, the placement determination unit 202 determines that the area with a size sufficient for the area for placing the virtual object is not identified (NO in step S4417). In this case, the processing proceeds to step S4418. In step S4418, the placement determination unit 202 additionally identifies the subarea 51 corresponding to the counter having a large value, among the subareas 51 adjacent to the identified subarea 51. In the example illustrated in FIG. 7F, the subareas 51e and 51i are adjacent to the identified subareas 51, and both correspond to the counter indicating a value of 5. Therefore, five subareas, which are the subareas 51e to 51i, are newly identified.

Figure 7G:
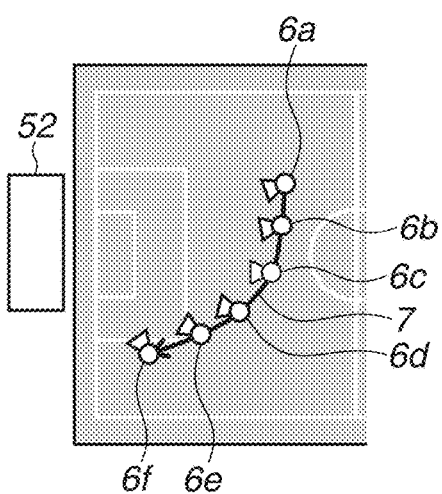

Since the subareas 51 are newly identified, the number of the identified subareas 51 is 5 in the example illustrated in FIG. 7F. Therefore, the placement determination unit 202 determines that the area with a size sufficient for the area for placing the virtual object is identified (YES in step S4417). In this case, the processing proceeds to step S4419. In step S4419, the placement determination unit 202 determines the identified subareas 51, as a placement area 52 of the virtual object, and generates the placement information. FIG. 7G illustrates the placement area 52 determined based on the movement path of the virtual viewpoint. The placement information generated by the placement determination unit 202 includes information for identifying the position (placement area 52) of the virtual object in the three-dimensional space such as a sports stadium where the subject is present. The placement information includes, for example, the vertices of a rectangle representing the placement area 52, the coordinates of the center of the rectangle, and the vertical and horizontal lengths of the rectangle.

Next, processing for determining the shape of the virtual object will be described with reference to FIG. 6C and FIGS. 8A to 8H. FIG. 6C illustrates details of the processing performed in step S442 of FIG. 6A. In step S4421, the placement determination unit 202 identifies a virtual object shape 53 corresponding to the positional relationship between the virtual viewpoint 6 and the placement area 52, by analyzing the leading virtual camera parameter of the virtual camera path. In a case where the virtual viewpoint 6a in the start frame corresponds to a position and an direction illustrated in FIG. 8A, a virtual object shape 53a perpendicular to the line of sight of the virtual viewpoint 6a is identified. In step S4422, the placement determination unit 202 determines whether an unprocessed virtual camera parameter is present. If the placement determination unit 202 determines that an unprocessed virtual camera parameter is present (YES in step S4422), the processing proceeds to step S4423. In step S4423, the placement determination unit 202 sets the next target parameter to be an analyzing target. The processing then returns to step S4421.

Figure 8A:
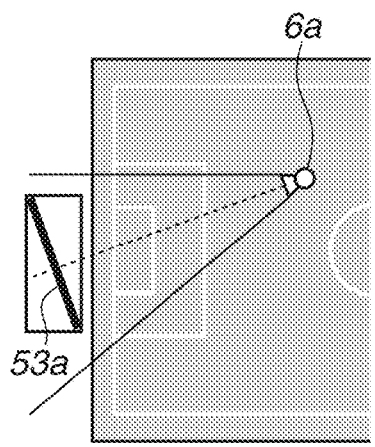
FIGS. 8A, 8B, 8C, 8D, 8E, 8F, 8G, and 8H are diagrams illustrating a method for determining a direction and a shape of a virtual object.
Figure 8B:
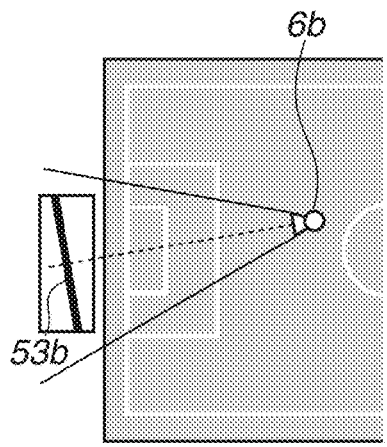
Figure 8C:
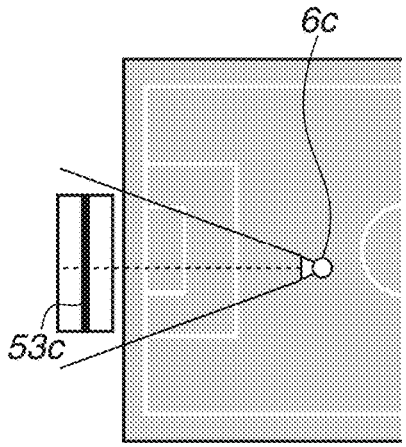
Figure 8D:
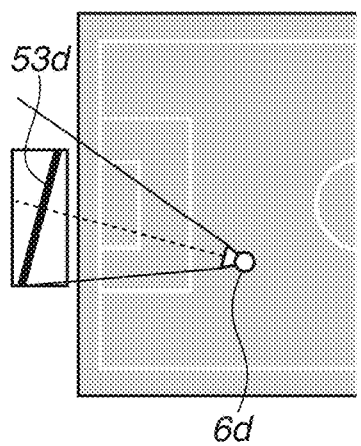
Figure 8E:
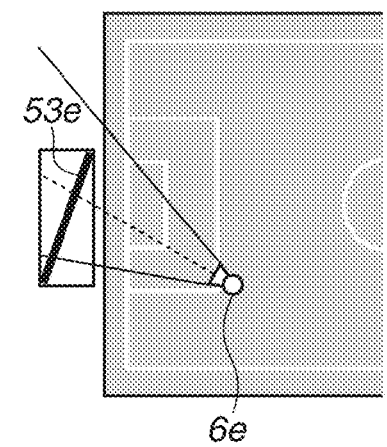
Figure 8F:
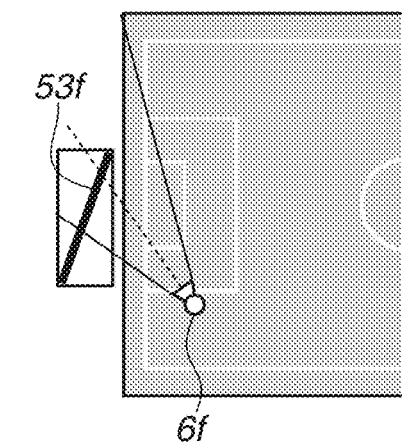
Figure 8G:
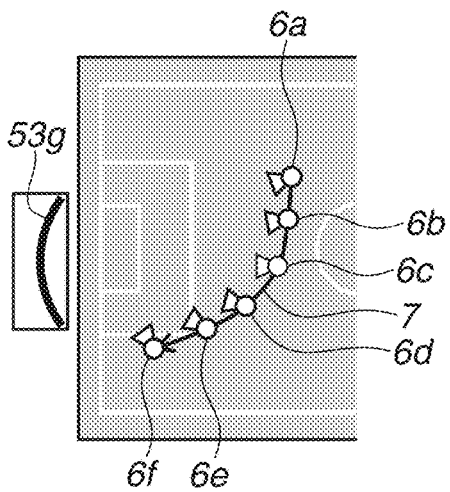
Figure 8H:
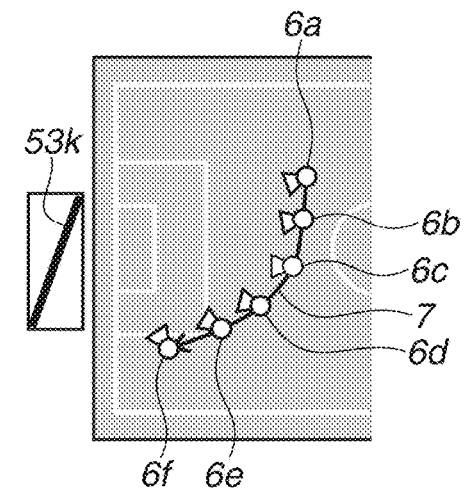

In a case where the virtual viewpoint 6 moves to the virtual viewpoint 6b as illustrated in FIG. 8B, a virtual object shape 53b perpendicular to the line of sight of the virtual viewpoint 6b is identified. Similarly, in a case where the virtual viewpoint 6 moves to the virtual viewpoints 6c and 6d as illustrated in FIGS. 8C and 8D, a virtual object shape 53c perpendicular to the line of sight of the virtual viewpoint 6c, and a virtual object shape 53d perpendicular to the line of sight of the virtual viewpoint 6d are identified, respectively. In a case where the virtual viewpoint 6 moves to the virtual viewpoints 6e and 6f as illustrated in FIGS. 8E and 8F, respectively, the size of the virtual object shape 53 perpendicular to the line of sight of virtual viewpoint 6 is small, if the virtual object is contained in the placement area 52. Therefore, virtual object shapes 53e and 53f not perpendicular to the line of sight of the virtual viewpoint 6e and the line of sight of the virtual viewpoint 6f, respectively, are identified to prevent the size of the virtual object from being too small. In step S4422, if the placement determination unit 202 determines that no unprocessed virtual camera parameter is present (NO in step S4422), the processing proceeds to step S4424.

Figure 9A:
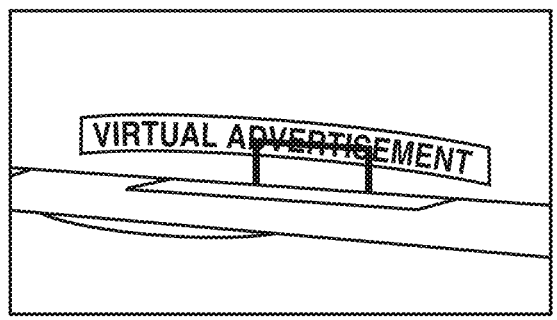
FIGS. 9A, 9B, and 9C are diagrams each illustrating a display example of a virtual object in a virtual viewpoint image.
Figure 9B:
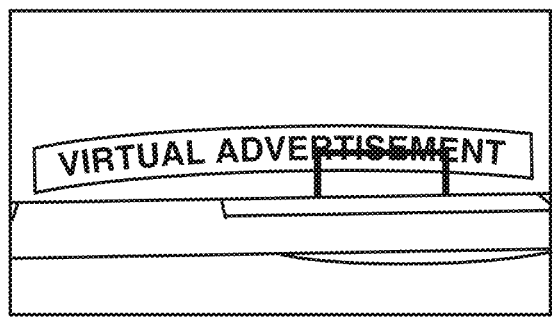
Figure 9C:
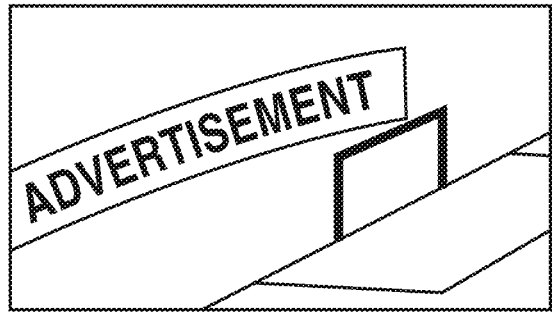

In step S4424, based on a change in the virtual object shape 53 identified in step S4421, the placement determination unit 202 determines the virtual object shape 53 for actual placement. For example, in a case where a change in the identified virtual object shape 53 is large, as represented by a change from the virtual object shape 53a to the virtual object shape 53f, the shape 53 for actual placement may be an arc, as indicated by a virtual object shape 53g in FIG. 8G. Further, in a case where a change in the identified virtual object shape 53 is not large, as represented by a change from the shape 53a to the shape 53c, an intermediate shape 53 as represented by a virtual object shape 53b in FIG. 8B may be determined as the shape 53 for actual placement. Alternatively, in a case where the same shape 53 is identified for a plurality of virtual camera parameters, as represented by the shapes 53e and 53f, a virtual object shape 53k in FIG. 8H may be determined as the virtual object shape 53 for actual placement. In other words, the shape 53 identified for the largest number of virtual camera parameters may be determined as the shape 53 for actual placement. The virtual viewpoint image is generated based on the actual object shape 53 determined in this way, and the shape of the virtual object in the three-dimensional space does not change with the movement of the virtual viewpoint. FIGS. 9A to 9C each illustrate a display example of the virtual object in the virtual viewpoint image, in a case where the virtual object shape 53 determined by the placement determination unit 202 is the virtual object shape 53g in FIG. 8G. FIGS. 9A, 9B, and 9C illustrate the display examples corresponding to the virtual viewpoints 6a, 6c, and 6f, respectively.

As described above, the placement determination unit 202 controls the display area for displaying the virtual object in the virtual viewpoint image, by controlling the position, the orientation, and the shape of the virtual object, based on the acquired virtual camera path. In particular, in the present exemplary embodiment, the display area for displaying the virtual object is determined based the virtual viewpoint at a first point in time and a virtual viewpoint at a second point in time on this movement path. The display area is to display the virtual object in a virtual viewpoint image corresponding to the virtual viewpoint at the first point in time on the movement path identified from the virtual camera path.

In the examples illustrated in FIGS. 7A to 7G and FIGS. 8A to 8H, the position of the virtual object at the first point in time (when the virtual viewpoint 6 is located at the virtual viewpoint 6f) in the three-dimensional space is determined, based on the virtual viewpoint at the first point in time (virtual viewpoint 6f) and the virtual viewpoint at the second point in time (such as the virtual viewpoint 6a). Further, based on the determined position, the area for displaying the virtual object in the virtual viewpoint image is determined. Here, the position of the virtual object at the first point in time and the position of the virtual object at the second point in time in the three-dimensional space are identical. The virtual object can be displayed in an appropriate area of the virtual viewpoint image corresponding to the virtual viewpoint at the first point in time, and the virtual object can be displayed in an appropriate area of the virtual viewpoint image corresponding to the virtual viewpoint at the second point in time, by such placement determination processing.

The method for determining the position, the shape, and the orientation of the virtual object is not limited to the method described above. For example, assume that an advertisement is displayed on one surface of the virtual object, and no advertisement is displayed on the other surface. In this case, it is desirable that the surface displaying the advertisement appears for a long time, in the view of the virtual viewpoint that moves according to the virtual camera path. Therefore, the placement determination unit 202 may determine the orientation of the virtual object, in such a manner that the surface displaying the advertisement among the surfaces of the virtual object is included in the virtual viewpoint image corresponding to the virtual viewpoint on the movement path identified by the virtual camera path.

In the present exemplary embodiment, the placement determination unit 202 is described to determine the position, the shape, and the orientation of the virtual object, according to the movement path of the virtual viewpoint. However, this is not limitative, and at least one of the position, the size, the shape, and the orientation of the virtual object may be determined according to the movement path of the virtual viewpoint. Further, information such as the content of the advertisement to be displayed by the virtual object may be determined according to the movement path of the virtual viewpoint.

<Placement of Plurality of Virtual Objects>

Next, a method for determining a virtual object position in a case where a plurality of virtual objects is to be placed will be described with reference to FIGS. 10A to 10I. Assume that two virtual objects are to be placed according to the movement path 7, in a case where the virtual viewpoint 6 moves from the virtual viewpoint 6a to the virtual viewpoint 6f. In this case, the placement determination unit 202 identifies the two placement areas 52 respectively corresponding to the first half and the second half of the movement path 7. In an example illustrated in FIGS. 10A to 10I, the virtual viewpoints 6a, 6b, and 6c correspond to the first half of the movement path 7, and the virtual viewpoints 6d, 6e, and 6f correspond to the second half of the movement path 7.

Figure 10A:
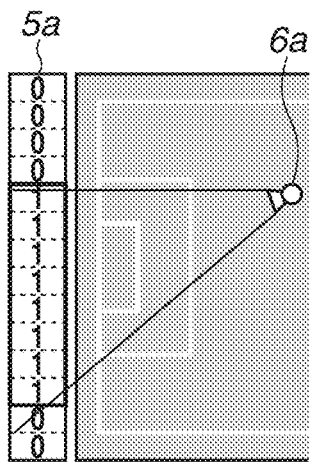
FIGS. 10A, 10B, 10C, 10D, 10E, 10F, 10G, 10H, and 10I are diagrams illustrating a method for determining a position of a virtual object, in a case where a plurality of virtual objects is placed.
Figure 10B:
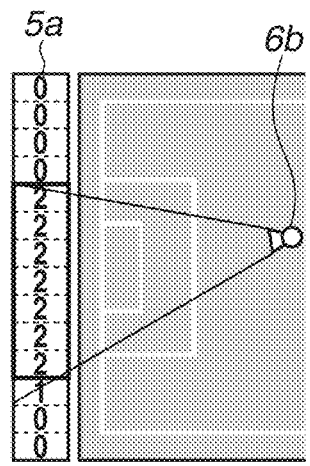
Figure 10C:
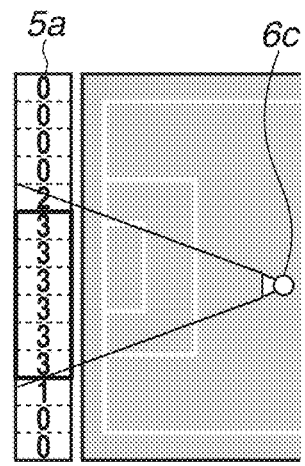
Figure 10D:
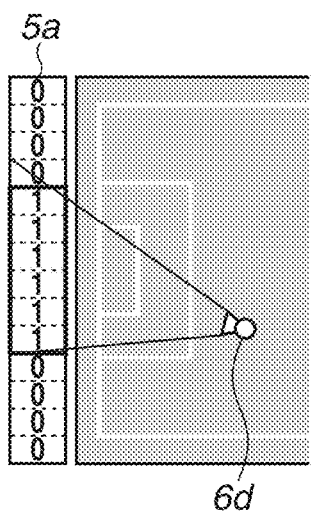
Figure 10E:
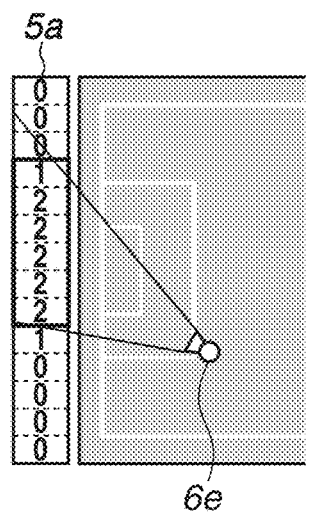
Figure 10F:
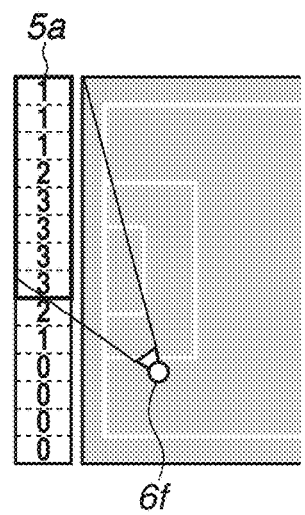
Figure 10G:
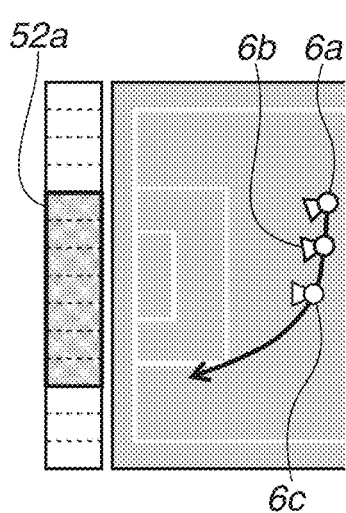
Figure 10H:
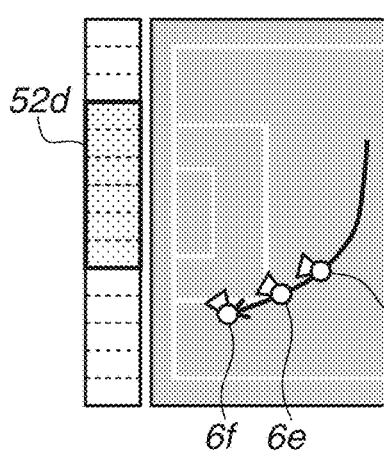
Figure 10I:
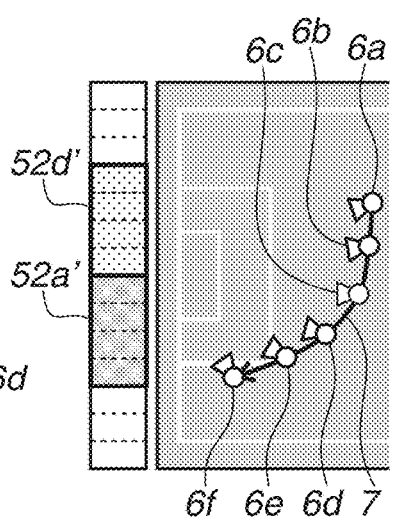

In the first half of the movement path 7, the value of the counter is determined for each of the subareas 51, as illustrated in FIGS. 10A, 10B, and 10C. In the second half of the movement path 7, the value of the counter is determined for each of the subareas 51, independently of the counter of the first half, as illustrated in FIGS. 10D, 10E, and 10F. As a result, a placement area 52a illustrated in FIG. 10G is identified as the placement area 52 corresponding to the counter value of the first half of the movement path 7. Further, a placement area 52d illustrated in FIG. 10H is identified as the placement area 52 corresponding to the counter value of the second half of the movement path 7. The placement determination unit 202 allocates the subareas 51 in which these two identified placement areas 52 overlap, in such a manner that the sizes of the respective two virtual objects become almost equal. As a result, the actual placement of the virtual object is determined in such a manner that one of the virtual objects is placed in a placement area 52a', and the other of the virtual objects is placed in a placement area 52d', as illustrated in FIG. 10I. The virtual viewpoint image is generated based on the actual placement of the virtual object determined in this way. The placement of the plurality of virtual objects in the three-dimensional space does not change with the movement of the virtual viewpoint.

<Placement Adjustment for Virtual Object>

In the above description, the placement of the virtual object is automatically determined based on the movement path of the virtual viewpoint. However, further, the user may be allowed to adjust the determined placement of the virtual object. The image processing system 10 in this case will be described below.

When an operation for adjusting the virtual object is performed by the user for the virtual viewpoint image previewed by the editing unit 301, the editing unit 301 provides an instruction for adjusting the virtual object to the placement determination unit 202. Upon receiving the instruction for adjusting the virtual object from the editing unit 301, the placement determination unit 202 updates the placement information, by adjusting the placement of the virtual object, based on the already generated placement information and the instruction for the adjustment. Here, the instruction for the adjustment includes, for example, information indicating an adjustment type such as size adjustment or position adjustment, and information indicating an adjustment amount such as 1.1-times enlargement or movement by 1 meter. The updated placement information is output to the image generation unit 201, and the virtual viewpoint image with the placement of the virtual object being adjusted is generated.

Next, a processing flow relating to the adjustment of the virtual object will be described. The flow in a case where the virtual object is adjusted is a modification of the processing flow in FIG. 4. More specifically, if the editing unit 301 determines that the generation of the virtual viewpoint image desired by the user is unsuccessful in step S7 of FIG. 4 (NO in step S7), the editing unit 301 displays an image for selection as to whether to perform adjustment of the virtual object on the display unit, and receives a user operation. If the editing unit 301 determines that the user operation for the adjustment is performed, the editing unit 301 instructs the image processing apparatus 2 to perform the adjustment according to the user operation specifying the adjustment type and the adjustment amount. The processing then returns to step S5. On the other hand, if the editing unit 301 determines that the user operation for the adjustment is not performed, the processing proceeds to step S8 and the above-described processing flow in FIG. 4 is executed.

Figure 11:
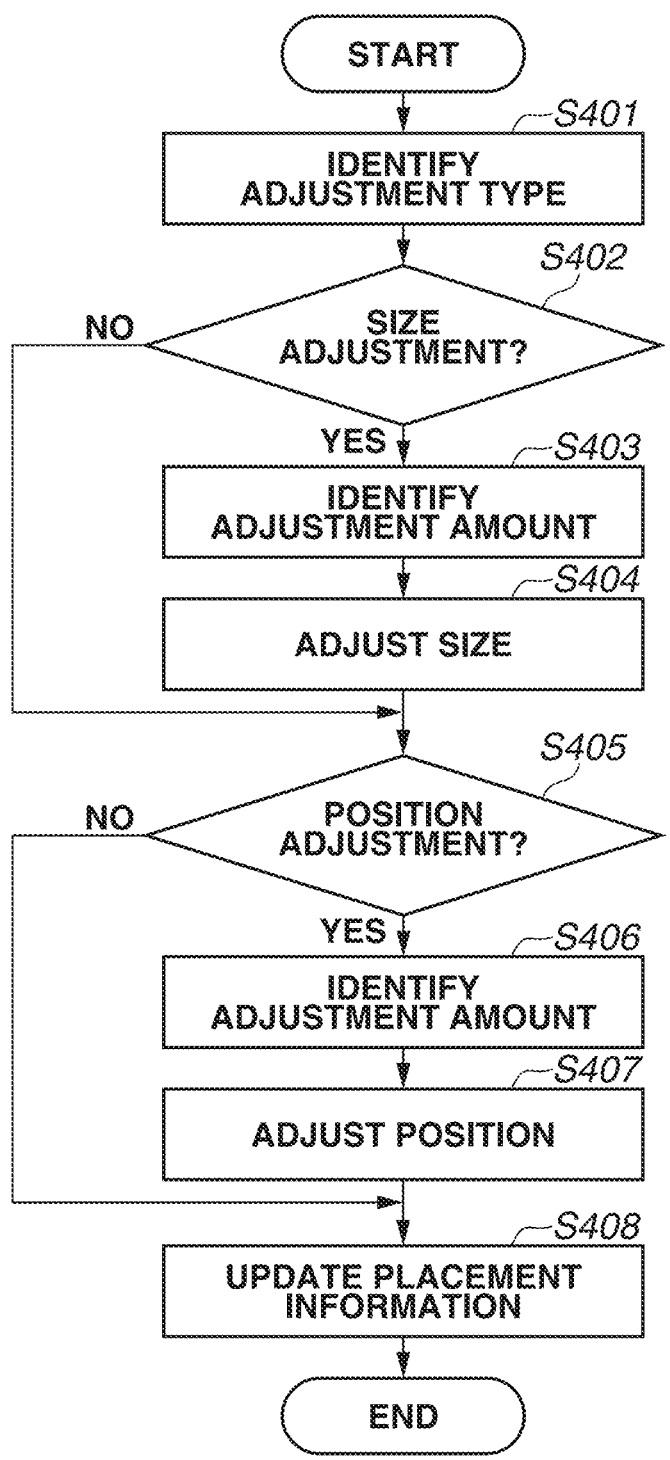
FIG. 11 is a flowchart illustrating processing relating to adjustment of a virtual object by the image processing apparatus.

In a case where the instruction for the adjustment is provided by the editing unit 301, the image processing apparatus 2 executes processing illustrated in FIG. 11, thereby updating the placement information. Subsequently, the processes in step S45 to S47 in FIG. 5 are performed. The virtual viewpoint image including the adjusted virtual object is thereby output. Next, processing for adjusting the virtual object by the image processing apparatus 2 will be described with reference to FIG. 11 and FIGS. 12A to 12F. The processing illustrated in FIG. 11 starts when the image processing apparatus 2 receives the instruction for the adjustment from the control apparatus 3. However, the timing when the processing illustrated in FIG. 11 starts is not limited to the above-described timing. The CPU 211 of the image processing apparatus 2 loads a program stored in the ROM 212 into the RAM 213, and executes the loaded program, thereby implementing the processing illustrated in FIG. 11. A dedicated piece of hardware different from the CPU 211 may implement at least a part of the processing illustrated in FIG. 11.

In step S401, the placement determination unit 202 identifies the adjustment type of the instruction for the adjustment received from the editing unit 301. In step S402, the placement determination unit 202 determines whether the identified adjustment type is the size adjustment for the virtual object. If the identified adjustment type is the size adjustment (YES in step S402), the processing proceeds to step S403. In step S403, the placement determination unit 202 identifies the adjustment amount. Then, in step S404, the placement determination unit 202 adjusts the size of the virtual object. The size adjustment may be, for example, adjustment for increasing the width and the height of the virtual object by 10%, or may be adjustment for specifying a maximum value or a minimum value of the ratio of an area occupied by the virtual object to the virtual viewpoint image.

If the identified adjustment type is not the size adjustment (NO in step S402), the processing proceeds to step S405. In step S405, the placement determination unit 202 determines whether the adjustment type is the position adjustment for the virtual object. If the adjustment type is the position adjustment (YES in step S405), the processing proceeds to step S406. In step S406, the placement determination unit 202 identifies the adjustment amount. Then, in step S407, the placement determination unit 202 adjusts the position of the virtual object. The position adjustment may be, for example, adjustment for placing the placement area 52 one meter away from the virtual viewpoint 6. Alternatively, the position adjustment may be adjustment for placing the placement area 52 away from the virtual viewpoint 6, in such a manner that the ratio of the area occupied by the virtual object to the virtual viewpoint image is equal to or less than a threshold. If the placement determination unit 202 determines that the adjustment type is not the position adjustment (NO in step S405), or if the adjustment in step S407 is completed, the processing proceeds to step S408. In step S408, the placement determination unit 202 updates the placement information of the virtual object. Then, the processing is ended in FIG. 11.

Figure 12A:
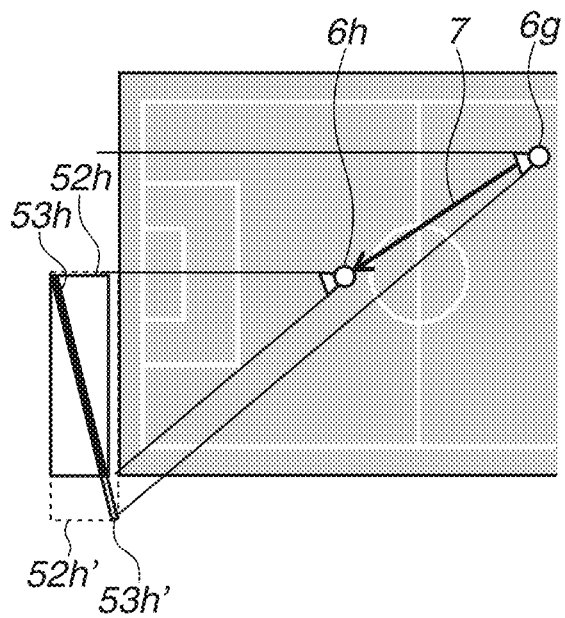
FIGS. 12A, 12B, 12C, 12D, 12E, and 12F are diagrams illustrating a method for adjusting a virtual object.
Figure 12B:
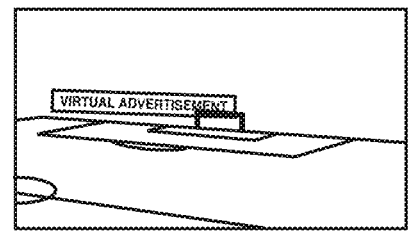

Assume that, for example, as illustrated in FIG. 12A, the movement path 7 for a movement from a virtual viewpoint 6*g* to a virtual viewpoint 6*h* is specified, and a placement area 52*h* and a virtual object shape 53*h* are determined accordingly. FIG. 12B illustrates a virtual viewpoint image corresponding to the virtual viewpoint 6*h* in this case. In a case where the distance between the virtual viewpoint 6 and the virtual object is long as in this case, the ratio of the area occupied by the virtual object to the virtual viewpoint image is small. Therefore, for example, in a case where an advertisement is to be displayed by the virtual object, it is effective to adjust the size of the virtual object so that the viewer can visually recognize the advertisement more easily.

Figure 12C:
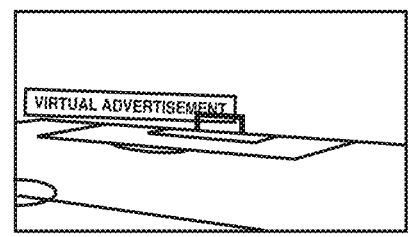

Assume that the user determines that the ratio of the area occupied by the virtual object to the virtual viewpoint image is too small, by confirming the preview of the virtual viewpoint image. In this case, the user performs an operation for increasing the size of the virtual object, via a GUI displayed by the control apparatus 3. Assume that the operation for increasing the width of the virtual object leftward by 20% when viewed from the virtual viewpoint 6 is performed in the example illustrated in FIG. 12A. In this case, the placement area 52*h* is changed to a placement area 52*h*', by the adjustment performed by the placement determination unit 202. As a result, the virtual object shape 53*h* is changed to a virtual object shape 53*h*'. Then, a virtual viewpoint image corresponding to the virtual viewpoint 6*h* after the adjustment is obtained as illustrated in FIG. 12C, and visibility of the virtual object for the viewer improves.

Figure 12D:
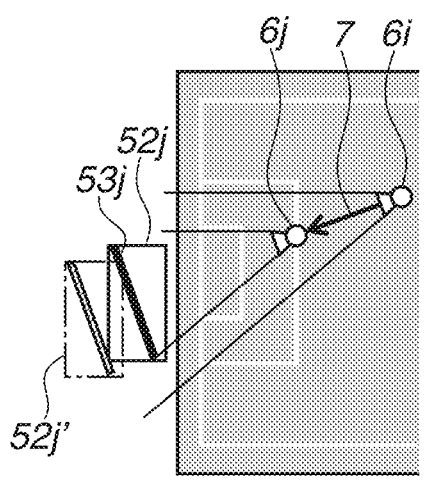
Figure 12E:
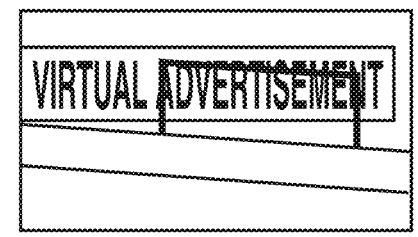

Further, in another example, assume that, as illustrated in FIG. 12D, the movement path 7 for a movement from a virtual viewpoint 6*i* to a virtual viewpoint 6*j* is specified, and a placement area 52*j* and a virtual object shape 53*j* are determined accordingly. FIG. 12E illustrates a virtual viewpoint image corresponding to the virtual viewpoint 6*j* in this case. In a case where the distance between the virtual viewpoint 6 and the virtual object is too short as in this case, the ratio of the area occupied by the virtual object to the virtual viewpoint image is too large. Therefore, it is effective to adjust the position of the virtual object, in order to reduce a possibility that the viewer cannot focus on a real subject because of the virtual object being unnecessarily noticeable.

Figure 12F:
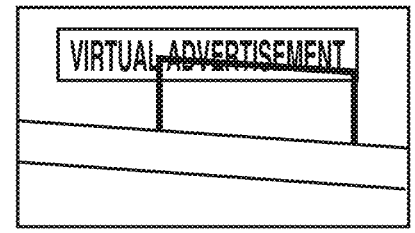

Assume that the user determines that the ratio of the area occupied by the virtual object to the virtual viewpoint image is too large, by confirming the preview of the virtual viewpoint image. In this case, the user performs an operation for changing the position of the virtual object, via a GUI displayed by the control apparatus 3. Assume that an operation for moving the position of the virtual object rearward by 10 meters when viewed from the virtual viewpoint 6 is performed in the example illustrated in FIG. 12D. In this case, the placement area 52*j* is changed to a placement area 52*j*', by the adjustment performed by the placement determination unit 202. Then, a virtual viewpoint image corresponding to the virtual viewpoint 6*j* after the adjustment is obtained as illustrated in FIG. 12F, and unnecessary noticeable appearance of the virtual object is suppressed.

As described above, in a case where the virtual object placed based on the movement path of the virtual viewpoint is too small or too large in the virtual viewpoint image, the image processing apparatus 2 adjusts the size or the position of the virtual object according to the user operation. In this way, the image processing apparatus 2 can provide the viewer with the virtual viewpoint image including the virtual object with appropriate visibility.

In the present exemplary embodiment, the placement determination unit 202 is described to determine the fixed point in the three-dimensional space where the subject is present, as the position of the virtual object. In addition, the shape and the orientation of the virtual object in the three-dimensional space do not change with the movement of the virtual viewpoint. Since the virtual object is placed and fixed in this way, the virtual object harmonizes naturally with the virtual viewpoint image. Therefore, visibility of the generated virtual viewpoint image for the user can be improved. However, this is not limitative. The position, the size, the shape, and the orientation of the virtual object in the three-dimensional space may change with the passage of time and the movement of the virtual viewpoint. Further, the placement determination unit 202 may directly control the position, the space, the shape, and the orientation of the virtual object in a two-dimensional virtual viewpoint image, according to the movement path of the virtual viewpoint, without determining the position, the size, the shape, and the orientation of the virtual object in a three-dimensional space.

Further, in the present exemplary embodiment, the placement of the virtual object is determined in such a manner that the virtual object appears for as long as possible in the moving image of the virtual viewpoint image. According to such a method for determining the placement, for example, in a case where the virtual object is an advertisement, an advertisement effect for the viewer can be enhanced. However, the method for determining the placement of the virtual object is not limited to this example. For example, the placement determination unit 202 may determine the placement of the virtual object, in such a manner that the virtual object is not included in a virtual object non-display area of the virtual viewpoint image. The virtual object non-display area may be, for example, an area that can be specified by the user, such as a central portion of the virtual viewpoint image. Alternatively, the virtual object non-display area may be an area, in which a predetermined subject is to be displayed, in the virtual viewpoint image. This can reduce a possibility that the viewer may have difficulty viewing a subject of interest in the virtual viewpoint image. Further, the virtual object non-display area may be an area for displaying a real advertisement included in a captured image for generating the virtual viewpoint image. Since the area for displaying the real advertisement is set as the virtual object non-display area, it is possible to suppress losing an opportunity to see the real advertisement by the viewer of the virtual viewpoint image.

As described above, the image processing system 10 according to the present exemplary embodiment generates the virtual viewpoint image, based on the plurality of captured images obtained by imaging the subject by the plurality of cameras from different directions, and the information according to the specification of the virtual viewpoint. Further, the image processing apparatus 2 included in the image processing system 10 acquires the viewpoint information for identifying the movement path of the virtual viewpoint relating to the generation of the virtual viewpoint image. Further, the image processing apparatus 2 performs control for changing the area for displaying the virtual object in the virtual viewpoint image corresponding to the virtual viewpoint at the first point in time on the movement path, according to the virtual viewpoint at the first point in time, and the virtual viewpoint at the second point in time. The virtual viewpoint at the second point in time is on the movement path, and the second point in time is different from the first point in time.

According to such a configuration, for example, the placement of the virtual object can be controlled to reduce a possibility that the virtual object to be included in the virtual viewpoint image may not be included in the virtual viewpoint image due to the movement of the virtual viewpoint. Moreover, for example, the placement of the virtual object can also be controlled to reduce a possibility that an important subject included in the virtual viewpoint image may be covered by the virtual object due to the movement of the virtual viewpoint. In other words, with the image processing apparatus 2 according to the present exemplary embodiment, in a case where the virtual viewpoint relating to the generation of the virtual viewpoint image moves, the virtual object can be displayed in a more appropriate area of the virtual viewpoint image.

According to the above-described exemplary embodiment, in a case where the virtual viewpoint relating to the generation of the virtual viewpoint image moves, the virtual object can be displayed in a more appropriate area of the virtual viewpoint image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-035930, filed Feb. 28, 2017, which is hereby incorporated by reference herein in its entirety.

What is claimed is:

1. An image processing apparatus comprising:
one or more memories that store a set of instructions; and
one or more processors that execute the instructions to:
acquire viewpoint information for specifying a movement path of a virtual viewpoint corresponding to a virtual viewpoint image to be generated based on captured images obtained by a plurality of image capturing devices that perform imaging from a plurality of directions; and
determine a position, in a three-dimensional space, of a virtual object which is to be displayed in the virtual viewpoint image and which is not included in the captured images, based on a plurality of virtual viewpoints on the movement path specified by the acquired viewpoint information,
wherein the determining of the position of the virtual object includes:
determining, for each of a plurality of candidate positions of the virtual object in the three-dimensional space, a number of viewpoints, a view of which includes a candidate position of the virtual object among the plurality of virtual viewpoints on the movement path; and
determining, as the position of the virtual object, one or more positions of the plurality of candidate positions based on the number of viewpoints determined for each of the plurality of candidate positions.

2. The image processing apparatus according to claim 1, wherein the one or more processors execute the instructions to;
determine at least one of a size, a shape, and an orientation of the virtual object based on the plurality of virtual viewpoints on the movement path.

3. The image processing apparatus according to claim 1, wherein the position of the virtual object in the three-dimensional space does not change according to a movement of the virtual viewpoint.

4. The image processing apparatus according to claim 1, wherein the one or more processors execute the instructions to;
determine a fixed position in the three-dimensional space, that does not change with a movement of the virtual viewpoint, as the position of the virtual object.

5. The image processing apparatus according to claim 1, wherein the one or more processors execute the instructions to;
determine the position of the virtual object so that the virtual object is displayed in all of a plurality of virtual viewpoint images that respectively correspond to the plurality of virtual viewpoints on the movement path and that are temporally consecutive.

6. The image processing apparatus according to claim 1, wherein the one or more processors execute the instructions to;
determine the position of the virtual object, so that the virtual object is not displayed in a virtual object non-display area of a virtual viewpoint image corresponding to a virtual viewpoint on the movement path.

7. The image processing apparatus according to claim 6, wherein the virtual object non-display area is an area, in which a predetermined subject is to be displayed, in a virtual viewpoint image.

8. The image processing apparatus according to claim 6, wherein the virtual object non-display area is an area in which a real advertisement included in the captured image is to be displayed.

9. The image processing apparatus according to claim 1, wherein the virtual object is an object for displaying an advertisement in a virtual viewpoint image.

10. The image processing apparatus according to claim 9, wherein the one or more processors execute the instructions to;
determine an orientation of the virtual object, so that a surface of the virtual object on which an advertisement is displayed, is included in a virtual viewpoint image corresponding to a virtual viewpoint on the movement path.

11. The image processing apparatus according to claim 1, wherein the acquired viewpoint information includes information for specifying a viewpoint position and information for specifying a viewing direction.

12. The image processing apparatus according to claim 1, wherein the one or more processors execute the instructions to;
generate a virtual viewpoint image including the virtual object, based on the determined position of the virtual object.

13. The image processing apparatus according to claim 1, wherein the one or more processors execute the instructions to;
output information for specifying at least the determined position of the virtual object to an image generation apparatus that generates the virtual viewpoint image.

14. The image processing apparatus according to claim 1, wherein the position of the virtual object does not change according to a passage of time.

15. The image processing apparatus according to claim 1, wherein the position of the virtual object does not change according to a movement of a subject to be imaged by the image capturing devices.

16. The image processing apparatus according to claim 1, wherein the determined one or more positions including a candidate position that is included in views of a largest number of viewpoints among the plurality of candidate positions.

17. The image processing apparatus according to claim 1, wherein the one or more processors execute the instructions to;
generate first shape data representing a three-dimensional shape of at least one subject based on the captured images obtained by the plurality of image capturing devices;
generate second shape data representing a three-dimensional shape of the virtual object based on the determined position of the virtual object;
generate a virtual viewpoint image including the virtual object based on the generated first shape data, the generated second shape data, and the movement path.

18. The image processing apparatus according to claim 17,
wherein the virtual viewpoint image including the virtual object is generated by combining the second shape data with the first shape data.

19. An image processing method comprising:
acquiring viewpoint information for specifying a movement path of a virtual viewpoint corresponding to a virtual viewpoint image to be generated based on captured images obtained by a plurality of image capturing devices that performs imaging from a plurality of directions; and
determining a position, in a three-dimensional space, of a virtual object which is to be displayed in the virtual viewpoint image and which is not included in the captured images, based on a plurality of virtual viewpoints on the movement path specified by the acquired viewpoint information,
wherein the determining of the position of the virtual object includes:
determining, for each of a plurality of candidate positions of the virtual object in the three-dimensional space, a number of viewpoints, a view of which includes a candidate position of the virtual object among the plurality of virtual viewpoints on the movement path; and
determining, as the position of the virtual object, one or more positions of the plurality of candidate positions based on the number of viewpoints determined for each of the plurality of candidate positions.

20. A non-transitory computer-readable storage medium storing a program for causing a computer to execute an image processing method, the image processing method comprising:
acquiring viewpoint information for specifying a movement path of a virtual viewpoint corresponding to a virtual viewpoint image to be generated based on captured images obtained by a plurality of image capturing devices that performs imaging from a plurality of directions; and
determining a position, in a three-dimensional space, of a virtual object which is to be displayed in the virtual viewpoint image and which is not included in the captured images, based on a plurality of virtual viewpoints on the movement path specified by the acquired viewpoint information,
wherein the determining of the position of the virtual object includes:
determining, for each of a plurality of candidate positions of the virtual object in the three-dimensional space, a number of viewpoints, a view of which includes a candidate position of the virtual object among the plurality of virtual viewpoints on the movement path; and
determining, as the position of the virtual object, one or more positions of the plurality of candidate positions based on the number of viewpoints determined for each of the plurality of candidate positions.

\* \* \* \* \*